(12) United States Patent
Siddam et al.

(10) Patent No.: US 9,118,491 B2
(45) Date of Patent: Aug. 25, 2015

(54) RETURN OF MULTIPLE RESULTS IN RULE GENERATION

(75) Inventors: Kalyan Premchand Siddam, Nepean (CA); Katha Kulasingam, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 204 days.

(21) Appl. No.: 12/827,832

(22) Filed: Jun. 30, 2010

(65) Prior Publication Data

US 2012/0005358 A1  Jan. 5, 2012

(51) Int. Cl.
| | |
|---|---|
| G06F 15/16 | (2006.01) |
| H04L 12/14 | (2006.01) |
| H04L 12/24 | (2006.01) |
| H04M 15/00 | (2006.01) |
| H04W 4/24 | (2009.01) |

(52) U.S. Cl.
CPC ........ *H04L 12/1407* (2013.01); *H04L 41/0893* (2013.01); *H04M 15/66* (2013.01); *H04W 4/24* (2013.01)

(58) Field of Classification Search
CPC . H04L 12/1407; H04L 41/0893; H04L 29/06; H04W 4/24
USPC ........................................................ 709/230
See application file for complete search history.

(56) References Cited

U.S. PATENT DOCUMENTS

| | | | | |
|---|---|---|---|---|
| 7,363,210 | B2 * | 4/2008 | Fehse .............................. | 703/21 |
| 2002/0068545 | A1 * | 6/2002 | Oyama et al. ................ | 455/406 |
| 2003/0074286 | A1 * | 4/2003 | Rodrigo ......................... | 705/32 |
| 2004/0028057 | A1 * | 2/2004 | Benjamin et al. ........ | 370/395.52 |
| 2004/0243672 | A1 * | 12/2004 | Markki et al. ................ | 709/204 |
| 2004/0243682 | A1 * | 12/2004 | Markki et al. ................ | 709/207 |
| 2004/0260701 | A1 * | 12/2004 | Lehikoinen et al. ........... | 707/10 |
| 2005/0027875 | A1 * | 2/2005 | Deng ............................ | 709/231 |
| 2007/0274481 | A1 * | 11/2007 | Guo et al. ................ | 379/114.03 |
| 2008/0189401 | A1 * | 8/2008 | Maes ............................ | 709/223 |
| 2009/0215454 | A1 * | 8/2009 | Przybysz et al. ........... | 455/435.1 |
| 2009/0254494 | A1 * | 10/2009 | Li et al. ........................ | 705/400 |
| 2009/0327112 | A1 * | 12/2009 | Li et al. .......................... | 705/34 |
| 2010/0223222 | A1 * | 9/2010 | Zhou et al. ..................... | 706/47 |
| 2010/0287599 | A1 * | 11/2010 | He et al. ............................ | 726/1 |
| 2011/0053555 | A1 * | 3/2011 | Cai et al. ...................... | 455/406 |
| 2011/0202491 | A1 * | 8/2011 | Pandya et al. ................. | 706/47 |

(Continued)

OTHER PUBLICATIONS

The PCC Rule in the 3GPP IMS Policy and Charging Control Architecture, Albaladejo, A.D.; de Gouveia, F.C.; Corici, M.I.; Magedanz, T. Global Telecommunications Conference, 2008. IEEE GLOBECOM 2008. IEEE Digital Object Identifier: 10.1109/GLOCOM.2008.ECP.306 Publication Year: 2008 , pp. 1-5.*

(Continued)

*Primary Examiner* — Razu Miah
(74) *Attorney, Agent, or Firm* — Kramer & Amado, P.C.

(57) ABSTRACT

Various embodiments relate to a Policy Charging and Rules Node (PCRN) and a related method and machine-readable medium for retrieving multiple results in response to a message. The PCRN may receive a message and, through handling the received message, may make a policy decision. The policy decision may require the PCRN to retrieve multiple related results. The PCRN may thereafter refer to a data arrangement that includes a rule set with at least one rule with multiple values. Based on the policy decision, the PCRN may retrieve the at least one rule. The PCRN may compile the rule from the rule set and may generate an answer message including at least one of these values included in the rule.

21 Claims, 6 Drawing Sheets

(56) References Cited

U.S. PATENT DOCUMENTS

2011/0208853 A1* 8/2011 Castro-Castro et al. ...... 709/223
2011/0276667 A1* 11/2011 Vihtari et al. ................ 709/221

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.

ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.

ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

| Subscriber Category | Predefined PCC Rule |
|---|---|
| silver | Free-Music |
| gold | Free-Sports, Free-Music, Free-Sports |
| platinum | Free-Music, Free-PPV |
| ... | ... |

RETURN OF MULTIPLE RESULTS IN RULE GENERATION

TECHNICAL FIELD

Various exemplary embodiments disclosed herein relate generally to policy and charging in telecommunications networks.

BACKGROUND

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, the 3GPP discloses some guidance on the establishment of an application session by the EPC upon receipt of an application request from an application function (AF) in the form of an AA-request (AAR) message or from a packet data network gateway (PGW) in the form of a credit control request (CCR) message. The 3GPP states that the PCRF is responsible for receiving requests, establishing IP-CAN and gateway control sessions, creating or modifying new policy and charging control (PCC) rules commensurate with such requests, and providing these new or modified PCC rules to the PCEF for installation. The 3GPP suggests a format for various messages and PCC rules. The 3GPP does not, however, describe how the PCRF should interpret a request, establish sessions, or create and subsequently lookup PCC rules. Such functionality is generally desired for the operation of the EPC.

In view of the foregoing, it would be desirable to influence the response of the PCRF to requests based on local configuration and rules-driven operation policy. In particular, it would be desirable to provide a customizable process by which a PCRF may retrieve a result and take appropriate action in response.

SUMMARY

In light of the present need for a device and method to return results retrieved by the PCRF, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method of a Policy and Charging Rules Node (PCRN) creating a PCC rule. The method may include receiving a message from a requesting device, wherein the request message includes an information set. The method may also include determining that a policy decision should be made, based on the information set in the request message and obtaining a rule set based on the information set, wherein the rule set includes at least one rule, the at least one rule including at least two values. The method may also comprise determining that the at least one rule is applicable to the information set and generating an answer message, wherein at least one value of the at least two values is included in the answer message.

Various embodiments may also relate to a Policy and Charging Rules Node (PCRN) for creating a PCC rule. The PCRN may comprise a rule storage that stores a plurality of rule sets comprising at least one rule, wherein the at least one rule includes at least two values. The PCRN may also comprise a message handler that receives a message including an information set from a requesting device. The PCRN may also comprise a rule matching engine that obtains a rule set based on the information set and determines that the at least one rule is applicable to the information set. The PCRN may also comprise a result interpreter that generates an answer message, wherein at least one value of the at least two values is included in the answer message.

Various embodiments may also relate to machine-readable instructions for a Policy and Charging Rules Node (PCRN) creating a PCC rule. The machine-readable medium may include instructions for receiving a message from a requesting device, wherein the request message includes an information set. The medium may also include instructions for determining that a policy decision should be made, based on the information set in the request message and obtaining a rule set based on the information set, wherein the rule set includes at least one rule, the at least one rule including at least two values. The medium may also comprise instructions for determining that the at least one rule is applicable to the information set and generating an answer message, wherein at least one value of the at least two values is included in the answer message.

It should be apparent that, in this manner, various exemplary embodiments enable a Policy and Charging Rules Node to lookup and retrieve multiple rule results. Particularly, by enabling the PCRN to retrieve multiple action values from a single lookup, the PCRN may reduce the number of required lookups when performing specific actions.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 1:
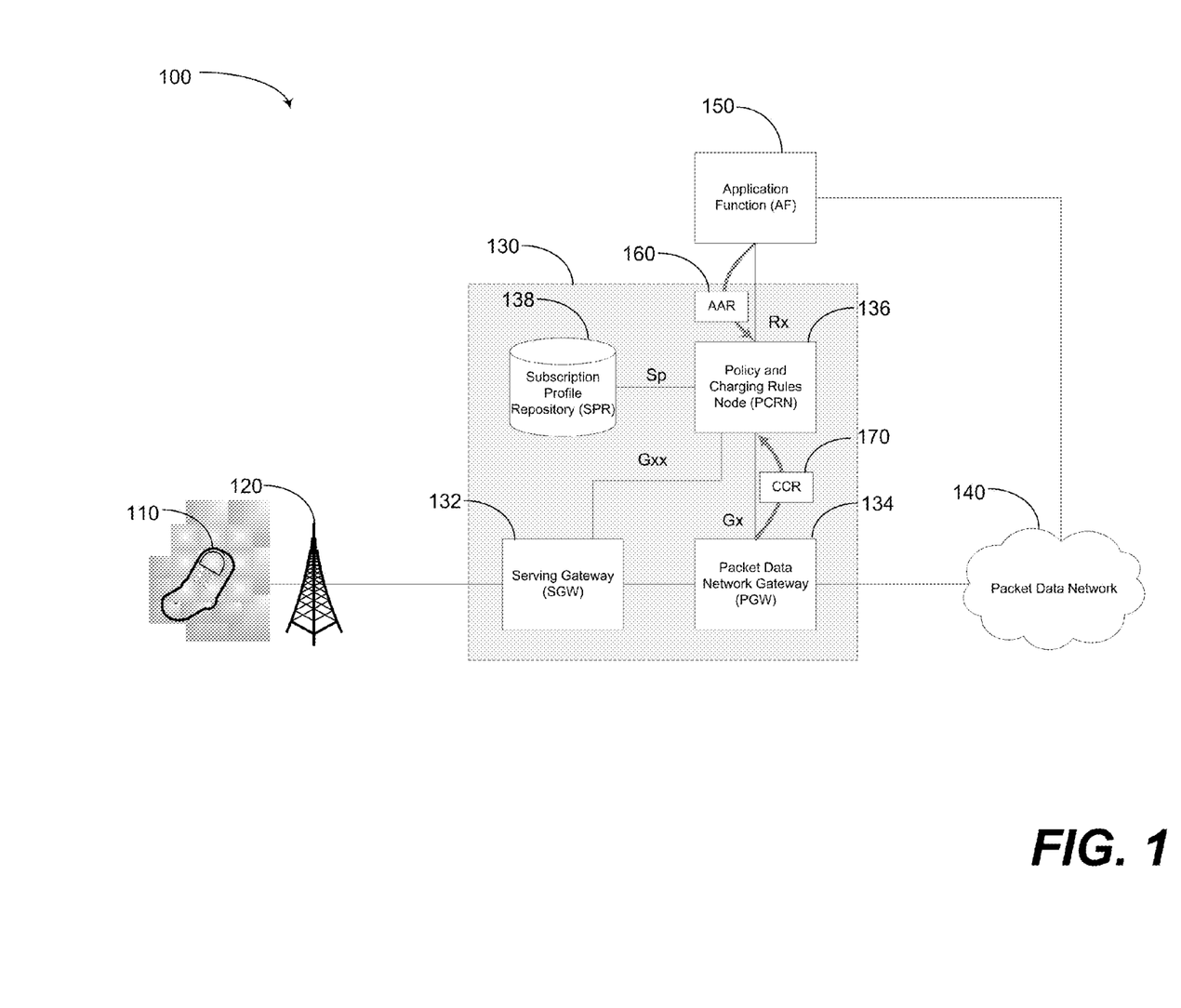
FIG. 1 illustrates an exemplary subscriber network for providing various data services.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130 to an end user of network 100. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP standard (PMIP), SGW 132 may include a bearer binding and event reporting function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW may construct a credit control request (CCR), such as CCR 170, requesting an appropriate allocation of resources and forward the request to PCRN 136.

It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices. In other embodiments, the retrieval of multiple rule results may be performed in different telecommunications networks, such as, for example, General Packet Radio Service (GPRS).

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an aa-request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive a request in the form of a credit control request (CCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

In processing various requests, PCRN 136 may make one or more policy decisions. The policy decisions made by PCRN 136 may be in the form of policy decision rules that may include a plurality of rule instances, which may be stored internally. As will be discussed in relation to FIGS. 2-6, upon receipt of a request, PCRN 136 may handle the message by making a policy decision and looking up an applicable rule set. Once found, PCRN 136 may use at least one of the applicable rule instances included in the rule set to create an answer message that may then be used to, for example, create, modify, or terminate a PCC rule. In some embodiments, PCRN 136 may also use other values in a rule instance to create, modify, or terminate other AVPs associated with a rule criterion.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as subscriber category, bandwidth limits, charging parameters, and subscriber priority.

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authorization and authentication request (AAR) 160 according to the Diameter protocol, to notify the PCRN 136 that resources should be allocated for the application service. This application request message may include information such as an identification of a subscriber using the application service and an identification of service data flows that are desired to be established in order to provide the requested service. AF 150 may communicate such an application request to the PCRN 136 via the Rx interface.

Figure 2:
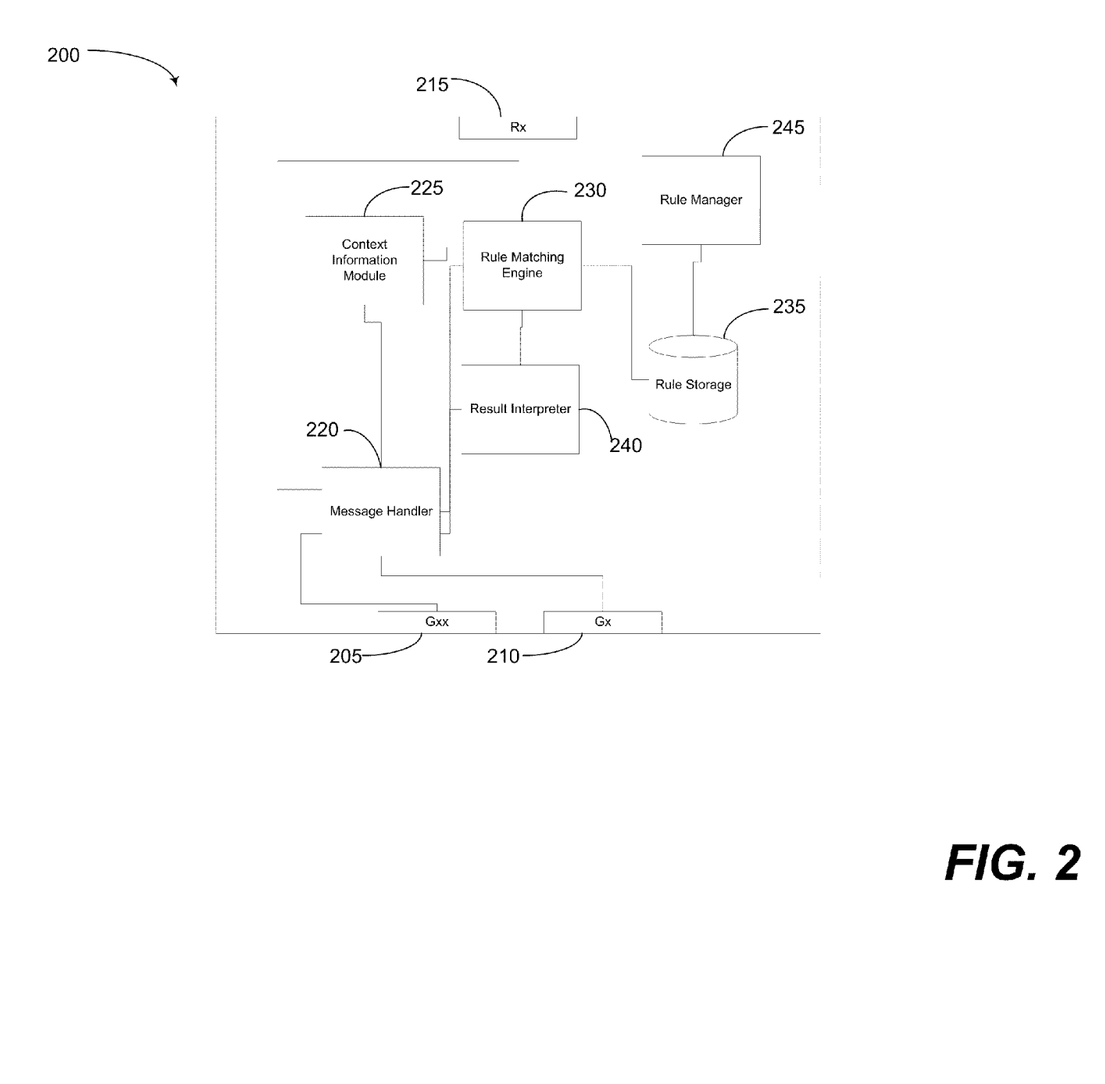
FIG. 2 illustrates an exemplary policy and charging rules node (PCRN) for generating and installing PCC rules.

FIG. 2 illustrates an exemplary policy and charging rules node (PCRN) for generating and installing PCC rules. PCRN 200 may correspond to PCRN 136 of exemplary subscriber network 100. PCRN 200 may include a Gxx interface 205, a Gx interface 210, an Rx interface 215, a message handler 220, a context information module 225, a rule matching engine 230, and a rule storage 235, a result interpreter 240, and a rule manager 245.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated application and session requests in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated application and session requests in the form of a CCR.

Rx interface 215 may be an interface comprising hardware and/or executable instructions encoded on a machine-readable storage medium configured to communicate with an AF such as AF 150. Such communication may be implemented according to the 3GPP TS 29.214. For example, Rx interface 215 may receive application and service requests in the form of an AAR.

Message handler 220 may include hardware and/or executable instructions on a machine-readable storage medium configured to process application requests, session requests, event notifications, and other messages received via Gxx interface 205, GX interface 210, and Rx interface 215. For example, message handler 220 may create and install new PCC rules in response to an application request. As a further example, message handler 220 may establish, modify, or terminate IP-CAN sessions and gateway control sessions in response to a session request.

After fully processing a incoming message, message handler 220 may construct and transmit a outgoing message over Gxx interface 205, GX interface 210, and/or Rx interface 215 to notify other nodes as to the result of processing the incoming message. For example, if message handler 220 creates a new PCC rule in response to an incoming message, it may construct an outgoing reauthorization request (RAR) message to push the new PCC rule to an appropriate PGW. In processing various incoming messages, message handler 220 may request a policy decision from rule matching engine 230 and base at least part of its response on the results of the policy decision. Message handler 220 may provide context information from the message to rule matching engine 230, either directly or via context information module 225.

Context information module 225 may include hardware and/or executable instructions on a machine-readable storage medium configured to provide various context information to rule matching engine 230. For example, context information module 225 may store information carried by a received message. Context information module 225 may further store previously received and/or transmitted messages associated with a subscriber, session, and/or service data flow. Context information module 225 may further access information stored elsewhere such as, for example, subscriber information stored in an SPR such as SPR 138.

Rule matching engine 230 may include hardware and/or executable instructions on a machine-readable storage medium configured to identify rules stored in rule storage 235 that are applicable to a received message. Each rule set may include a criteria section which indicates when a rule set is applicable. The rule set may include one or more rule instances with a plurality of values that may be applicable to a received message. In such instances, a matching rule set may return one or more rule instances after it is determined to be applicable. Rule matching engine 230 may compare this criteria section to context information passed to it by message handler 220 and/or retrieved from context information module 225. Upon locating an applicable rule set, message handler may pass the one or more rule instances as rule results to result interpreter 240. In various embodiments, rule matching engine 230 may stop attempting to match other rule instances at this point. In some embodiments, rule matching engine 230 may pass multiple rule results to result interpreter simultaneously.

Rule storage 235 may be any machine-readable medium capable of storing policy decision rules for use by rule matching engine 230. Accordingly, rule storage 235 may include a machine-readable storage medium such as read-only memory (ROM), random-access memory (RAM), magnetic disk storage media, optical storage media, flash-memory devices, and/or similar storage media. In various alternative embodiments, rule storage 235 may be a device that is external to the PCRN 200. Rule storage 235 may store definitions of numerous policy decision rules. Such definitions may include, for example, a criteria section and a result section.

Result interpreter 240 may include hardware and/or executable instructions on a machine-readable storage medium configured to interpret a result section of a rule passed by rule matching engine 230. In some embodiments, the result section of a rule may include multiple values from one or more rule results. Result interpreter 240 may compile the results indicated by the result section of one or more rule instances into a policy decision result and subsequently pass the policy decision result to message handler 220.

Rule manager 245 may include hardware and/or executable instructions on a machine-readable storage medium configured to define, modify, and otherwise manage policy decision rules. For example, rule manager 245 may receive a definition of a new policy decision rule, format the definition according to a standard policy decision rule syntax used by PCRN 200, and store the definition in rule storage 235. Rule manager 260 may further provide a definition of an existing policy decision rule to a user upon request. Rule manager 245 may subsequently receive a modified rule definition, format the definition if necessary, and store the definition in rule storage 235. In storing a modified definition, rule manager 245 may overwrite an existing definition or store the modified definition as a new version of the policy decision rule while preserving the old definition. Thus, rule manager 245 may provide version control functionality.

Figure 3:
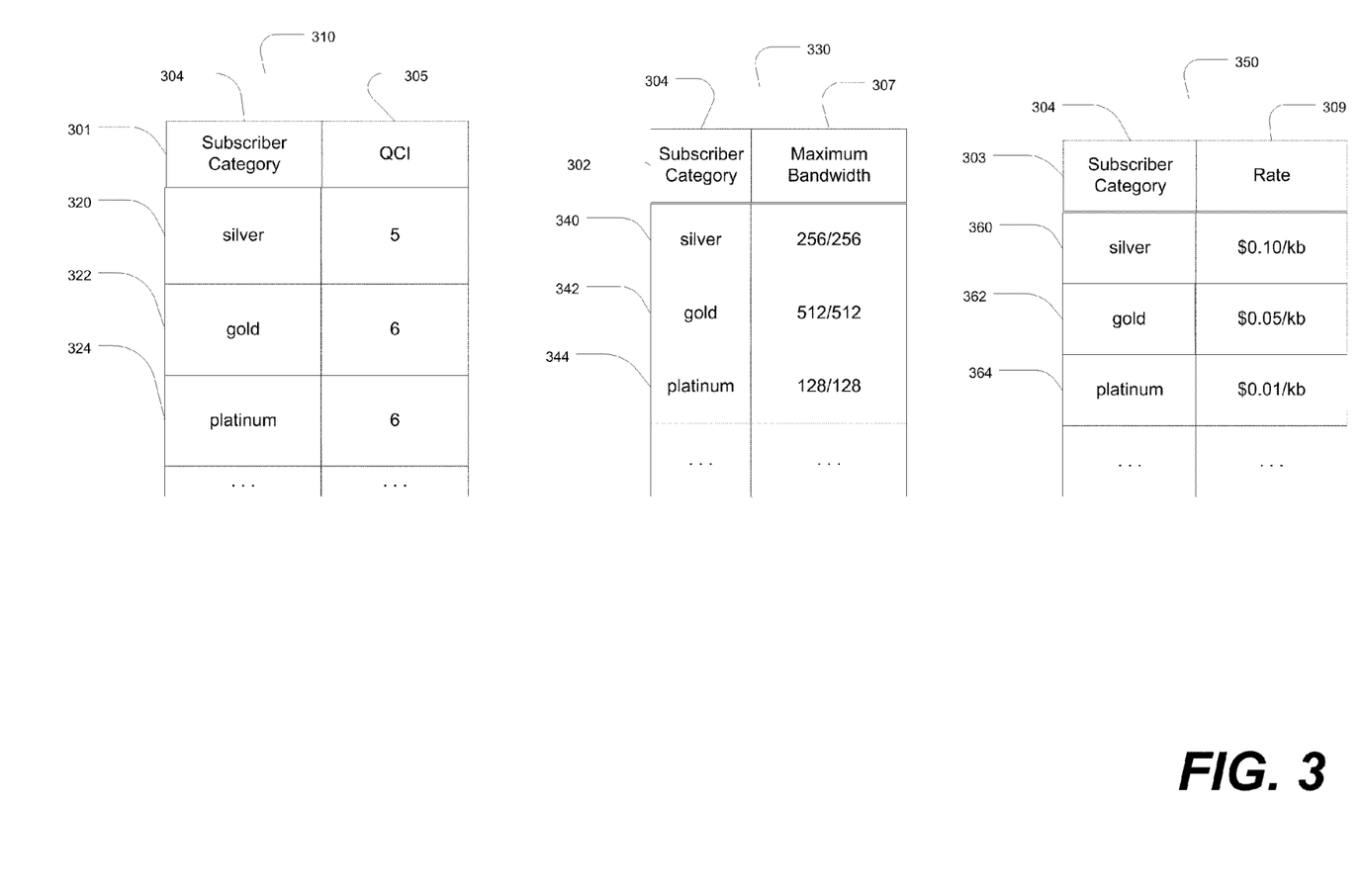
FIG. 3 illustrates an exemplary data arrangement for storing single-result policy decision rules in the embodiment shown in FIG. 2.

FIG. 3 illustrates an exemplary data arrangement for storing single-result policy decision rules. Data arrangement 300 may comprise a plurality of rule tables 310, 330, 350. In some embodiments, data arrangement 300 may comprise more or less rule tables. Each rule table 310, 330, 350 may comprise a rule definition 301, 302, 303 and one or more rule instances 320-324, 340-344, 360-364. For example, Mapping QCI table 310 may have a rule definition 301 comprising rule criteria 304 and a QCI field 305. Similarly, bandwidth table 330 may have a maximum bandwidth field 307, while charging table 350 may have a rate field 309. Each rule table 310, 330, 350 may also have one or more rule instances 320-324, 340-344, 360-364.

In an illustrative embodiment, the PCRN 200 may refer to one or more rule tables 310, 330, 350 to obtain rule results. In some embodiments, the PCRN 200 may base a lookup on a policy decision. In some embodiments, the PCRN 200 may perform a series of successive lookups in order to obtain rule results from different rule tables. For example, the PCRN 200 may, based on a received message and subsequent policy decision, require results relating to a PCC rule pertaining to its QCI, maximum bandwidth, and charging rate. Based on the policy decision, the PCRN 200 may require that the rule results be associated with the "silver" criterion. PCRN 200 may therefore refer to QCI table 310 and find rule instance 320, with a QCI value of "5". PCRN 200 may then store the value of the rule result. PCRN 200 may then refer to tables 330, 350 to locate rule instances 340, 360 that are also associated with the "silver" criterion and store the "256/256" and "$0.10/kb" respectively. PCRN 200 may then use the stored rule results when generating or updating a PCC rule.

In various embodiments, a particular request may be associated with multiple values of the same type. For example, different charging rates may be used for different service data flows implementing a single request. In such instances, PCRN 200 may include a distinct table for each value of the multiple values. For example, PCRN 200 may include a table for charging rates applicable to video streams and a table for charging rates applicable to control streams. A policy decision to retrieve such multiple results of the same may result in a great number of retrievals, as PCRN 200 may repeatedly refer to multiple tables in order to construct an answer message that takes all necessary or useful values into account.

Figure 4:
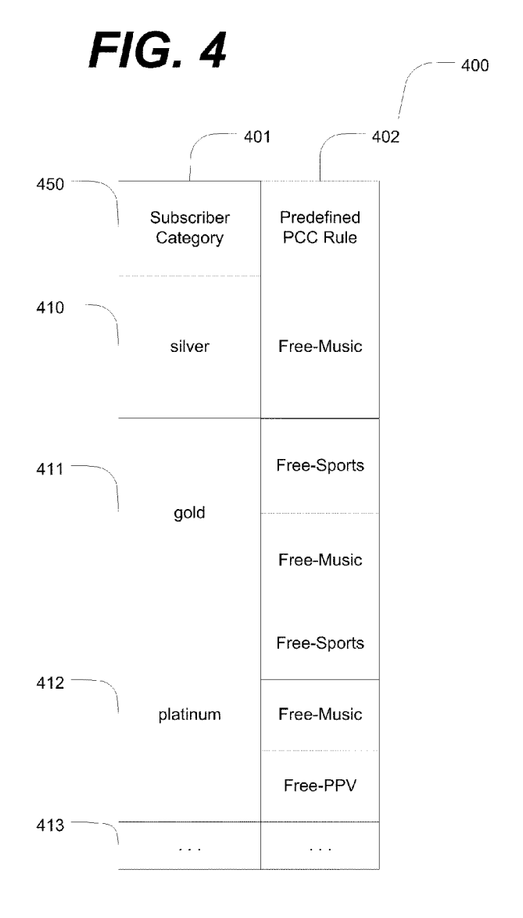
FIG. 4 illustrates an exemplary data arrangement for storing rules including multiple value results.

FIG. 4 illustrates an exemplary data arrangement 400 for storing rules including multiple value results. Data arrangement 400 may be, for example, a table in a database stored in rule storage 235 or at any other element internal or external to PCRN 300. Alternatively, data arrangement 300 could be a series of linked lists, an array, or a similar data structure. Thus, it should be apparent that data arrangement 300 is an abstraction of the underlying data; any data structure suitable for storage of the underlying data may be used. PCRN 200 may utilize data arrangement 400 when generating a policy decision to determine at least one predefined PCC rule for use in responding to a particular request.

Data arrangement 400 may include two fields: a subscriber category field 401 and a predefined PCC rule field 402. Subscriber category field 401 may indicate criteria for determining when a particular rule is applicable. In the present example, a value for subscriber category may be used to determine whether a particular rule is applicable. In various alternative embodiments, other attributes or context information may be used instead of a subscriber category for determining applicability of a rule. For example, data arrangement 400 may instead include a field storing an APN value, an identifier for an Application Function, or a time of day. Further, in various alternative embodiments, additional criteria may be used in determining whether a rule is applicable. For example, data arrangement 400 may include subscriber category field 401 and a time of day field (not shown). Alternatively, data arrangement 400 may simply include a generic criteria field (not shown) that stores a conditional statement for evaluation in determining whether a particular rule is applicable.

Predefined PCC Rule field 402 may store one or more PCC rule names. Such rule names may correspond to predefined PCC rules stored at PCRN 200, PGW 134, or elsewhere. Such rule names may be used as part of a result from a policy decision by the PCRN 200 in responding to a request message.

As an example, rule 410 may indicate that it is applicable when a subscriber category is "silver." Rule 410 may further indicate that, when it is applicable, the PCC rule name "Free-Music" should be returned as part of a policy decision. The PCRN 200 may then use this value as needed or useful.

As a further example, rule 411 may indicate that it is applicable when a subscriber category is "gold." Rule 411 may also indicate that, when it is applicable, both PCC rule names "Free-Sports" and "Free-Music" should be returned. The PCRN 200 may then determine how to use these values. In various embodiments, rule 411 may be implemented as a single rule including multiple result values, while in other embodiments, rule 411 may in fact be two independent rule instances having similar criteria.

As yet another example, rule 412 may indicate that it is applicable when the subscriber category is "platinum," and that, in such a case, three predefined PCC rule names should be returned: "Free-Sports," "Free-Music," and "Free-PPV." As with rule 411, rule 412 may be a single rule with three result values or three independent rule instances. Data arrangement 400 may include numerous additional rules 413.

It should be noted that data arrangement 400 is only one example of a rule table providing multiple results. A similar approach may be taken with regard to any attribute type that may be returned in a policy decision function. For example, rules may be defined to return multiple event triggers or charging rates for certain criteria.

Figure 5:
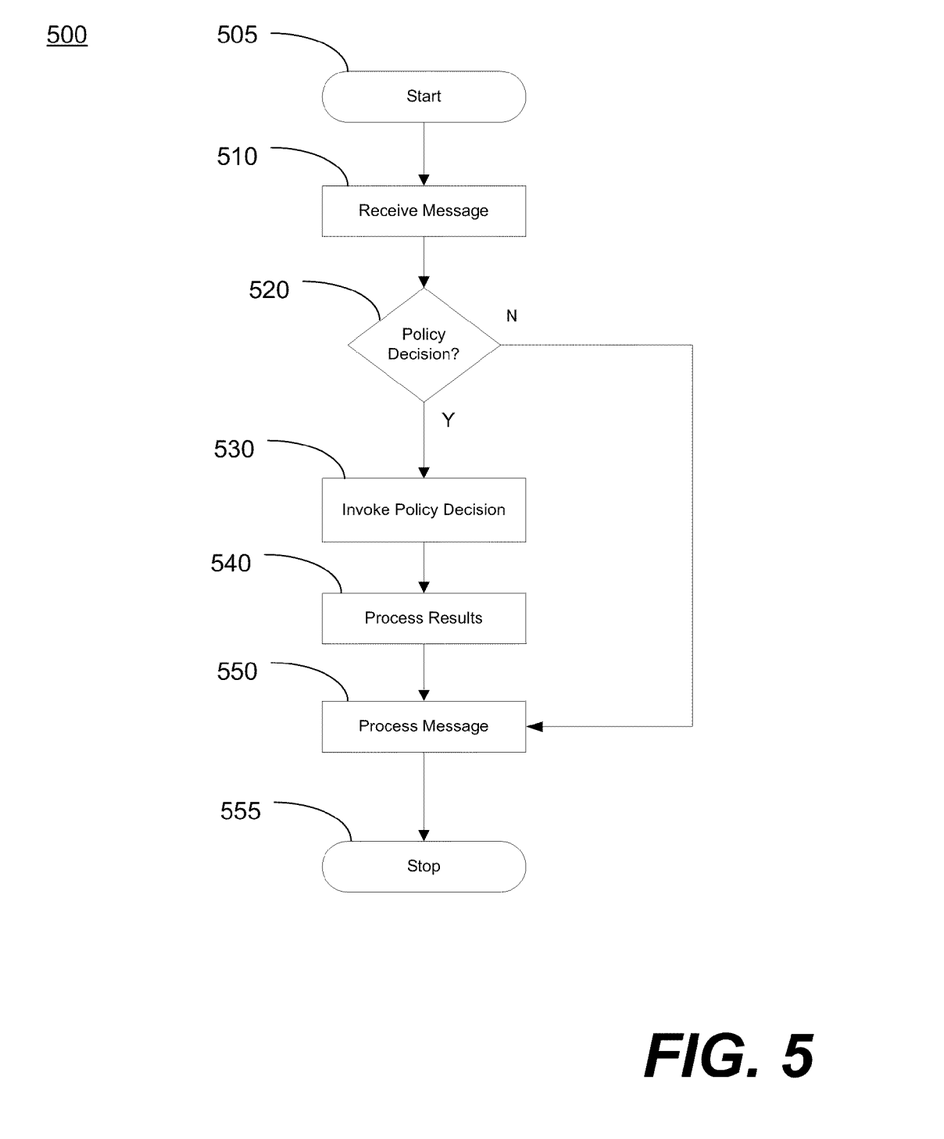
FIG. 5 illustrates an exemplary method for processing a received message in the embodiment shown in FIG. 2.

FIG. 5 illustrates an exemplary method 500 for processing a received message. Method 500 may be performed by the components of PCRN 200 such as, for example, message handler 220.

Method 500 may begin in step 505 and proceed to 510 where PCRN 200 may receive a message via Gxx interface 205, Gx interface 210, and/or Rx interface 215. Method 500 may then proceed to step 520, where PCRN 200 may determine whether a policy decision should be made in order to process the received message. If a policy decision is necessary, method 500 may proceed to step 530. Otherwise, method 500 may proceed to step 550.

At step 530, PCRN 200 may invoke a policy decision and await a policy decision result before continuing. In invoking a policy decision, message handler 220 may extract information from the received message and pass it to context information module 225 or directly to rule matching engine 230. Alternatively, message handler 220 may pass the received message in its entirety to context information module 225 or directly to rule matching engine 230. Upon receiving a policy decision result, method 500 may proceed to step 540.

At step 540, PCRN 200 may process the received policy decision result. Method 500 may then proceed to step 550 where PCRN 200 may finish processing the received message in light of any received policy decision results. Step 550 may include, for example, creating a new PCC rule, establishing an IP-CAN session, and/or transmitting an acknowledgement message to another node. Method 500 may then end in step 555.

Figure 6:
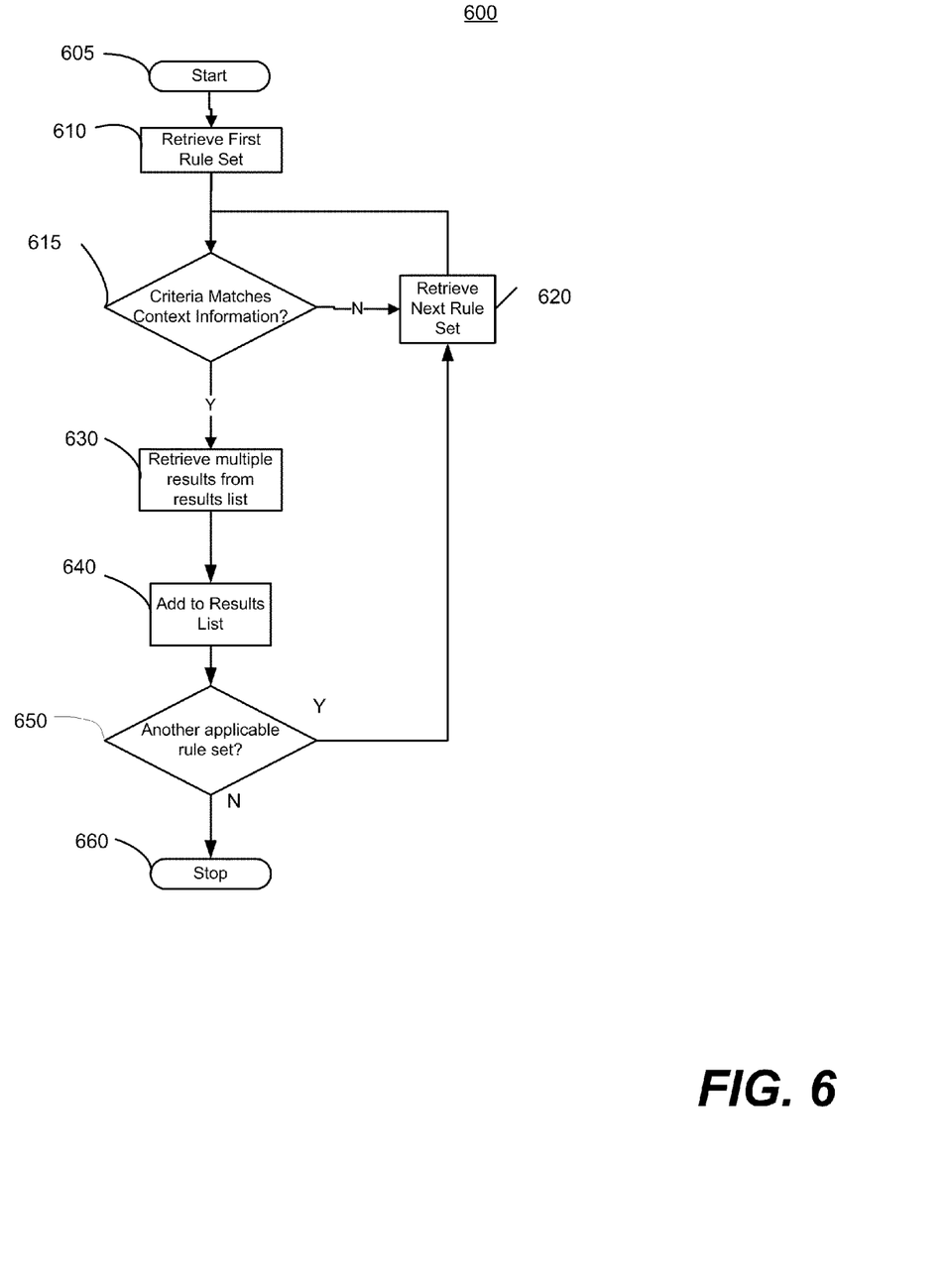
FIG. 6 illustrates an exemplary method for retrieving multiple results in the embodiment shown in FIG. 2.

FIG. 6 illustrates an exemplary method 600 for retrieving multiple rule results. Method 600 may be performed by the components of PCRN 200 such as, for example, rule matching engine 230 and/or result interpreter 240. Method 600 may correspond to step 530 (FIG. 5) or may be performed in parallel to method 500 after the execution of step 530.

Method 600 may begin in step 605 and proceed to step 610 where PCRN 200 may retrieve a first rule set. PCRN 200 may determine the applicable rule set from context information stored in context information module 225 or message handler 220 may specify a rule set when invoking a policy decision. After retrieving the first rule set, method 600 may proceed to step 615.

At step 615, PCRN 200 may compare the criteria portion of the rule set to relevant context information passed by message handler 220 and/or context information module 225. If the criterion does not match the context information, method 600 may proceed to step 620 where PCRN 200 may retrieve the next rule set from rule storage 230. Method 600 may then loop back to step 615.

If, on the other hand, PCRN 200 determines that the criteria section of a rule set matches the context information at step 615, method 600 may proceed to step 630. At step 630, PCRN 200 may retrieve results from the result section of the matching rule set. For example, PCRN 200 may retrieve each value from a rule instance and/or each predefined PCC rule associated with the matching criterion. At step 640, PCRN 200 may add the retrieved results to the policy decision result list.

At step 650, PCRN 200 may determine whether another applicable rule set exists. This may occur, for example, if the context information indicates that the multiple subscriber categories match the context information, or when the context information requires values beyond those provided in a set of rule instances, such as when the context information requires PCRN 200 to provide a set of predefined PCC rules and a set of Event-Trigger AVPs. When at step 650, the PCRN 200 determines that another rule set may be applicable, the method 600 may return to step 620 and retrieve another rule set; otherwise the method 600 may end at step 660.

Having described exemplary components and methods for the operation of exemplary subscriber network 100 and PCRN 200, an example of the operation of exemplary network 100 and PCRN 200 will now be provided with reference to FIGS. 1-6. PCRN 200 may correspond to PCRN 136. The contents of rule storage 235 may be indicated by data arrangement 400.

The process may begin when PCRN 136 receives CCR 170 requesting the establishment of a new service data flow. Message handler 220 may extract information from the message, including a subscriber ID, and send the information to context information module 225. PCRN 136 then determines that a policy decision must be made and, at step 530, invokes a policy decision specifying that the PCC rule creation rule set should be used.

Rule matching engine then retrieves rule set 410. As the criteria section uses the Subscriber Category 401 variable, rule matching engine 230 may request this information from context information module 225. Context information module 225, in turn, may retrieve the record associated with the subscriber ID from SPR 138 and determine that Subscriber Category 401 is "platinum." Rule matching engine 230 then determines that rule set 410 is not applicable at step 615, as the value of "silver" for the subscriber category does not match the target criterion of "platinum." Rule matching engine 230 may similarly loop upon retrieval of rule set 411 until it retrieves rule set 412 at step 620. As the criteria of rule set 412 specifies that the rule set is applicable when Subscriber Category 401 is "platinum," rule matching engine 230 determines that rule set 412 is applicable and passes the rule set to result interpreter 240.

Result interpreter 240 then retrieves the predefined PCC rules for "Free-Sports", "Free-Music", and "Free-PPV" as results associated with the matching subscriber criterion of "platinum" in step 630. The predefined PCC rules may then be added into the results list at step 640. After determining that no other rule sets are applicable at step 650, message handler 220 may include the predefined PCC rules in a message sent to PGW 134 in steps 540 and 550.

According to the foregoing, various exemplary embodiments provide for a flexible method of processing messages received at a PCRN. Particularly, by enabling the retrieval of multiple messages during a single lookup, the speed of PCRN 200 actions may increase and may be more efficient for specific tasks that require the retrieval of multiple, related results as the number of lookups necessary are reduced. Further, the method allows for simpler rule creation and management by an operator of the PCRN.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method of a Policy and Charging Rules Node (PCRN) creating a Policy and Charging Control (PCC) rule, the method comprising:
   receiving, at the PCRN, a request message from a requesting device, the request message including an information set;
   determining that a policy decision should be made based on the information set in the request message;
   obtaining a rule set for making the policy decision based on the information set, wherein the rule set includes a plurality of policy decision rules, at least one policy decision rule including at least two values;
   determining that the at least one policy decision rule is applicable to the information set; and
   generating an answer message, wherein the at least two values of the applicable policy decision rule are included within the PCC rule in the answer message.

2. The method of claim 1, further comprising:
   reviewing the information set in the received message; and
   generating a target rule criteria based on at least a portion of the information set in the received message.

3. The method of claim 2, wherein the target rule criteria comprises a set of context information.

4. The method of claim 3, wherein determining that the at least one rule is applicable further comprises comparing the rule set with the context information.

5. The method of claim 2, wherein the at least one policy decision rule comprises a rule criteria and the at least two values and the step of determining that the at least one policy decision rule is applicable further comprises matching the rule criteria of the rule set with the target rule criteria.

6. The method of claim 1, further comprising:
   forwarding the generated answer message to at least another device to enable the service requested.

7. The method of claim 1, wherein the rule set comprises at least two rules, wherein each of the at least two rules are the same type.

8. A Policy and Charging Rules Node (PCRN) for creating a policy and charging control (PCC) rule, the PCRN comprising:
   a rule storage that stores a plurality of rule sets comprising at least one policy decision rule, wherein the at least one policy decision rule includes at least two values;
   a message handler that receives a request message including an information set from a requesting device;
   a rule matching engine that obtains a rule set based on the information set and determines that the at least one policy decision rule is applicable to the information set; and
   a result interpreter that generates an answer message, wherein the at least two values of the applicable policy decision rule are included in the PCC rule in the answer message.

9. The PCRN of claim 8, wherein the message handler further reviews the information set in the received message and generates a target rule criteria based on at least a portion of the information set in the received message.

10. The PCRN of claim 9, wherein the target rule criteria comprises a set of context information.

11. The PCRN of claim 10, wherein the rule matching engine compares the rule set with the context information.

12. The PCRN of claim 9, wherein the rule matching engine matches a rule criteria of each policy decision rule in the rule set with the target rule criteria.

13. The PCRN of claim 8, further comprising:
   a second interface to forward the generated answer message to at least another device to enable the service requested.

14. The method of claim 8, wherein the rule set comprises at least two policy decision rules, wherein each of the at least two policy decision rules are the same type.

15. A non-transitory machine-readable medium encoded with instructions for a Policy and Charging Rules Node (PCRN) creating a rule, the machine-readable medium comprising:
   instructions for receiving a message from a requesting device, the request message including an information set;
   instructions for determining that a policy decision should be made based on the information set in the request message;
   instructions for obtaining a rule set for making the policy decision based on the information set, wherein the rule set includes a plurality of policy decision rules, at least one policy decision rule including at least two values; and
   instructions for determining that the at least one policy decision rule is applicable to the information set; and
   instructions for generating an answer message, wherein the at least two values of the applicable rule are included in the answer message.

16. The non-transitory machine-readable medium of claim 15, further comprising:
   instructions for reviewing the information set in the received message; and
   instructions for generating a target rule criteria based on at least a portion of the information set in the received message.

17. The non-transitory machine-readable medium of claim 16, wherein the target rule criteria comprises a set of context information.

18. The non-transitory machine-readable medium of claim 17, wherein instructions for determining that the at least one policy decision rule is applicable further comprises comparing the rule set with the context information.

19. The non-transitory machine-readable medium of claim 16, wherein instructions for determining that the at least one policy decision rule is applicable further comprises matching a rule criteria of the rule set with the target rule criteria.

20. The non-transitory machine-readable medium of claim 15, further comprising:
   instructions for forwarding the generated answer message to at least another device to enable the service requested.

21. The non-transitory machine-readable medium of claim 16, wherein the rule set comprises at least two policy decision rules, wherein each of the at least two rules are the same type.

* * * * *